US006945485B1

(12) United States Patent
Douglas

(10) Patent No.: US 6,945,485 B1
(45) Date of Patent: Sep. 20, 2005

(54) MULTIPLE VERTICAL AUGER CUTTER MIXER

(75) Inventor: Scott F. Douglas, Sioux Falls, SD (US)

(73) Assignee: New Direction Equipment Co., Sioux Falls, SD (US)

( * ) Notice: Subject to any disclaimer, the term of this patent is extended or adjusted under 35 U.S.C. 154(b) by 134 days.

(21) Appl. No.: 10/436,914

(22) Filed: May 14, 2003

Related U.S. Application Data
(60) Provisional application No. 60/379,988, filed on May 13, 2002.

(51) Int. Cl.$^7$ .......................... A01B 34/00; B02B 5/02; B02C 19/00; B02C 9/04; B03B 7/00
(52) U.S. Cl. ......................... 241/101.761; 241/260.1; 241/605
(58) Field of Search ....................... 241/101.761, 260.1, 241/605

(56) References Cited

U.S. PATENT DOCUMENTS

| | | | |
|---|---|---|---|
| 4,538,949 A | | 9/1985 | Liet et al. |
| 5,249,751 A | | 10/1993 | Schuler |
| 5,429,436 A | * | 7/1995 | Stone .......................... 366/141 |
| 5,590,963 A | | 1/1997 | Schuler |
| 5,601,362 A | | 2/1997 | Schuler |
| 5,647,665 A | | 7/1997 | Schuler |
| 6,328,465 B1 | | 12/2001 | Tamminga |
| 6,409,377 B1 | | 6/2002 | Van Der Plas |
| 6,505,786 B2 | | 1/2003 | Van Der Plas |
| 6,663,275 B2 | * | 12/2003 | Knight .......................... 366/141 |

OTHER PUBLICATIONS

Jay Lor Fabricating, Inc. brochure Models 1300, 1350, 1500, 1600.
Schuler Manufacturing & Equipment Co., Inc. brochure Models 300, 400, 490, 610, 700.
Trioliet Mullos B.V. brochure Models 1200, 1400, 1600, 1800, 2000.
Supreme International Limited brochure Models 500, 600, 700, 900.
New Direction Equipment Co. brochure Models 402, 492, 502, 552, 602, 652, 702, 802, 1002, 1202.
New Direction Equipment Co. brochure Model 1202.

* cited by examiner

*Primary Examiner*—Allen Ostrager
*Assistant Examiner*—Jason Y Pahng
(74) *Attorney, Agent, or Firm*—Reising, Ethington, Barnes, Kisselle & Learman, P.C.

(57) ABSTRACT

The cutter mixer has a mixer tub with side walls and a floor. The floor includes a primary floor portion at a lower elevation. At least one secondary floor is positioned vertically above the primary floor portion. A primary vertical spindle is journaled in the center of the primary floor. A secondary vertical spindle is journaled on the secondary floor. Auger flighting is attached to the primary spindle. Auger flighting is also attached to the secondary spindle. The flighting decreases in width from the bottom to the top of each spindle. The bottom of the flighting on the primary spindle sweeps over substantially all the primary floor. The flighting on the secondary spindle overlaps the flighting on the primary spindle and sweeps fodder from the secondary floor to the primary floor. The augers are driven to cut and mix fodder and discharge fodder from the primary floor.

16 Claims, 3 Drawing Sheets

MULTIPLE VERTICAL AUGER CUTTER MIXER

The disclosure incorporates a multiple vertical auger cutter mixer disclosed in provisional patent application 60/379,988, filed May 13, 2002, whose priority is claimed for this application.

TECHNICAL FIELD

The cutter mixer for cutting and mixing rations for cattle and other animals has multiple augers that rotate about vertical axes.

BACKGROUND OF THE INVENTION

Cattle are fed rations that include fodder, silage, and protein supplements. The fodder includes grasses and other plants such as clover and alfalfa. Silage is various green plants that are chopped into small pieces and fermented in a silo. The protein supplement is usually ground or palletized grain. Grains that are commonly used include corn, milo, soy beans, barley and oats. Alfalfa can be processed and used as a protein supplement. Fish meal has also been used as a protein supplement in the past.

The fodder is dried and baled in most cases. The bales are generally large round bales or large rectangular bales. Both large round and rectangular bales generally weigh between 1,200 and 2,000 pounds. Such bales can be handled and transported economically. Fodder can also be dried and stored in loose stacks.

The fodder is mixed with silage and or with a protein supplement. The fodder is reduced to relatively small pieces either before or during mixing with either silage or a protein supplement. Cows will leave large pieces of coarse fodder and eat only the silage and protein supplement if the fodder is not reduced to a small particle size. Machines for reducing fodder include hammer mill grinders and vertical spindle mixers.

The vertical spindle mixers have a large tub with an open top. One or more vertical spindles are mounted on the floor of the tub. These spindles include auger flighting and bars with sharp or toothed edges attached to the auger flighting. Rotating the spindle or spindles reduces the fodder in a large bale to small pieces within a few minutes. Silage and a protein supplement can be mixed with fodder in the mixer. After the feed in the tub is reduced and mixed, a discharge door in a side wall of the tub is opened and the feed is forced through the door by an auger. A single spindle mixer discharges the feed through the discharge door and cleans the tub floor rapidly. Large mixers with two or three vertical spindles also discharge the material rapidly but tend to leave some fodder on the tub floor. Some of the feed tends to be passed from one spindle to another spindle rather than being discharged through the discharge opening after the tub is mostly emptied.

SUMMARY OF THE INVENTION

The mixer has a tub with side walls and a floor. The floor has a primary floor at a lower elevation and a secondary floor at a high elevation. A primary vertical spindle is mounted on the primary floor. Auger flighting is attached to the primary spindle. A secondary vertica spindle is attached to the secondary floor at a higher elevation. Auger flighting is attached to the secondary vertical spindle. Knives are mounted on the auger flighting. A discharge door is provided in the tub wall in a position to discharge feed from the primary vertical spindle. The cylindrical wall that surrounds the lower portion of the primary spindle directs feed to the discharge opening when the opening is open. Feed on the secondary floor at a high elevation is fed to the primary floor by the secondary vertical spindle as the tub is emptied through the discharge opening.

Multiple secondary spindles can be provided on the higher secondary floor if desired.

BRIEF DESCRIPTION OF THE DRAWINGS

These presently preferred embodiment of the invention is disclosed in the following description and in the accompany drawings, wherein.

DETAILED DESCRIPTION OF THE PREFERRED EMBODIMENT

Figure 1:
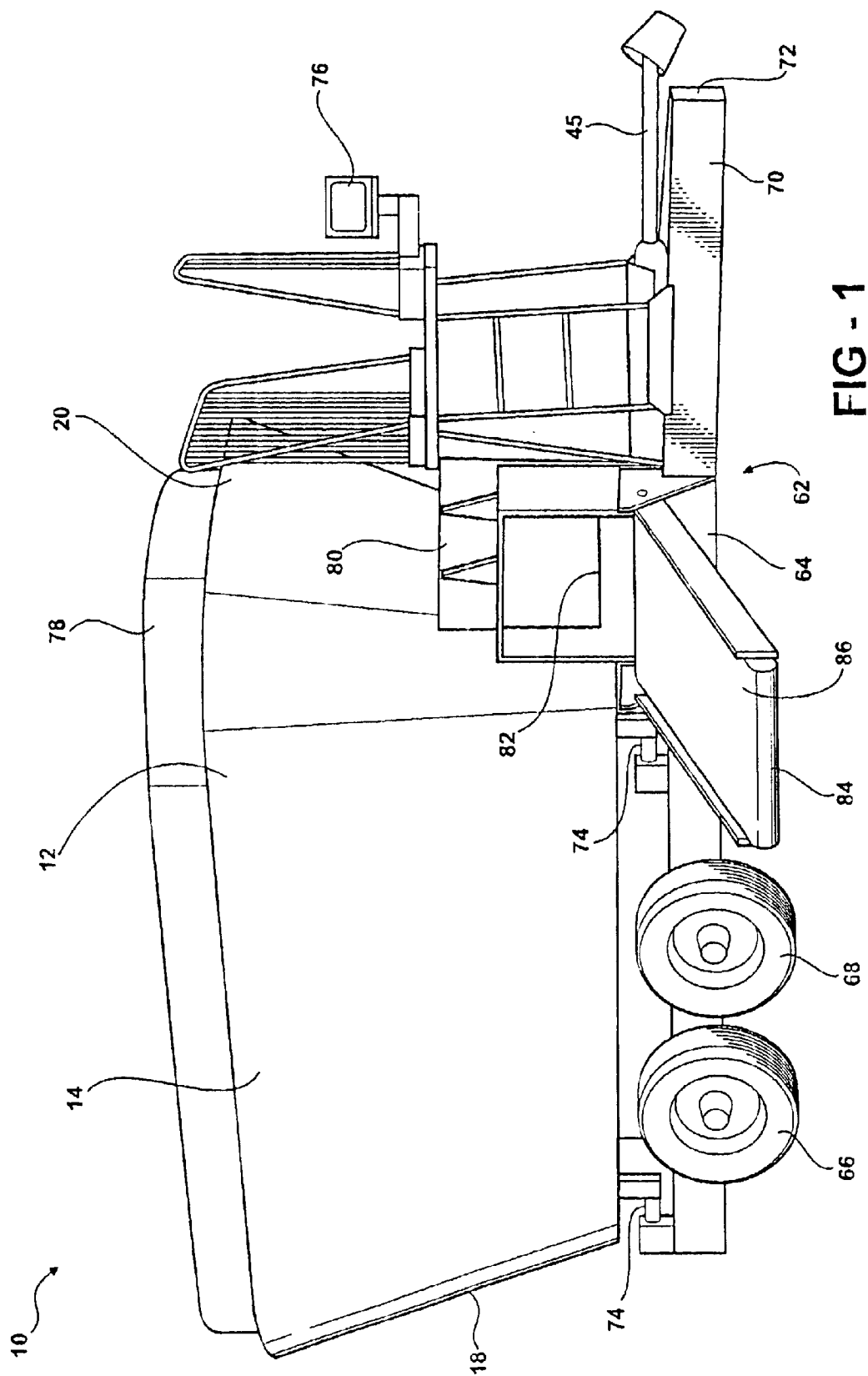
FIG. 1 is a perspective view of the fodder mixer.

The multiple vertical auger cutter mixer 10 includes a tub 12 with walls 14 and a floor 16. The walls 14 surround the tub 12 and extend upward and outward from the floor 16. The ends 18 and 20 of the tub 12 are accurate as viewed from above.

Figure 2:
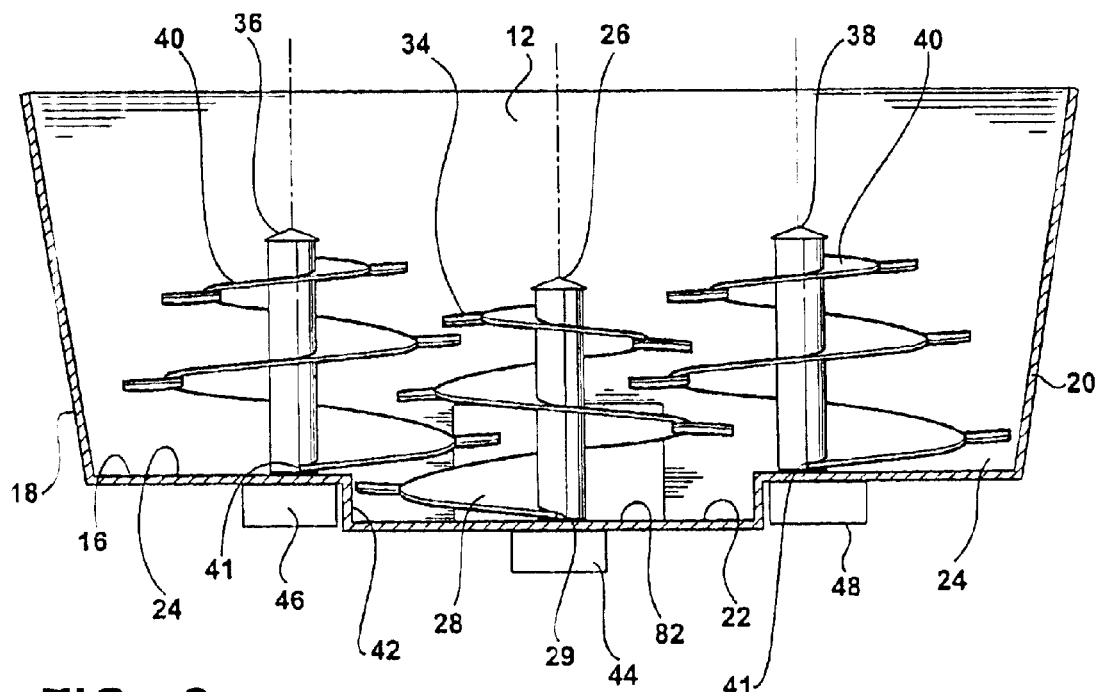
FIG. 2 is a vertical sectional view of the tub with three vertical augers and attached cutters.
Figure 3:
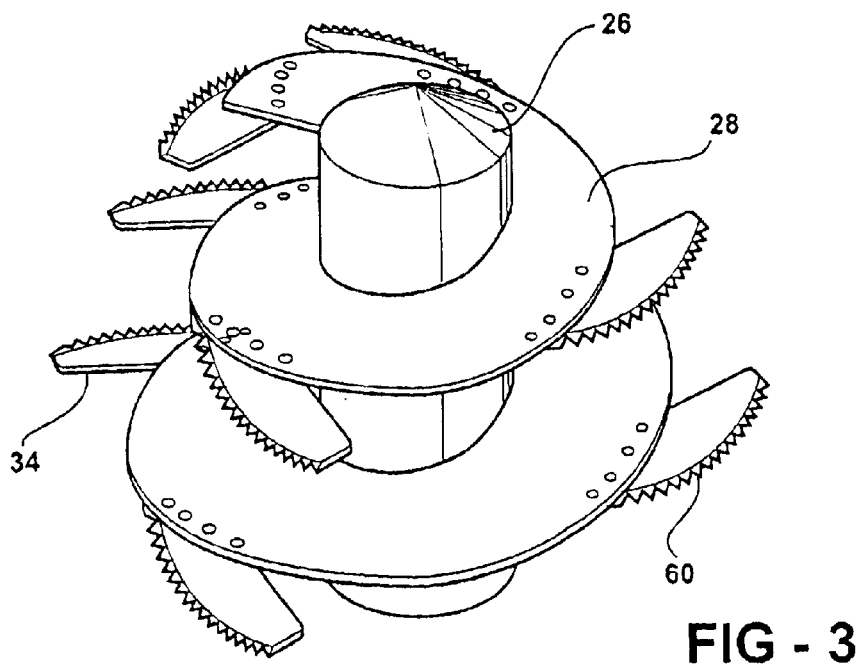
FIG. 3 is an enlarged perspective view of one vertical auger and attached cutters.

The floor 16 of the tub 12 includes a primary floor 22 that forms the lower portion of the tub. A secondary floor 24 is raised up above the primary floor 22. The secondary floor 24 can have a single section, two sections as shown in FIG. 2, or more sections.

A primary vertical spindle 26 is journaled on the primary floor 22. The primary spindle 26 has auger flighting 28 that extends radially outward from the spindle. The radially outer edge of the flighting 28 extends radially out co sweep an envelope that defines a conical area. The flighting 28 at the bottom of primary spindle extends radially outward from the spindle at least twice as far as the flighting at the top of the spindle. Cutters 34 are clamped to the radially outer edge of the flighting 28. Secondary vertical spindles 36 and 38 are journaled on the secondary floor 24. Flighting 43 is attached to the spindles 36 and 38. The flighting 40 on the secondary spindles 36 and 38 is similar to the flighting on the primary spindle 26. The secondary spindles 36 and 38 are the same height as the primary spindle 26. The diameter of the portions of the secondary floor 24 swept by the flighting 40 is the same as the diameter of the portions of the primary floor 22 swept by the flighting 28. The flighting 40 can be modified to accommodate the difference between the height of the primary spindle 26 and the height of the secondary spindles 36 and 38 if their vertical heights are not the same.

A generally cylindrical wall portion 42 surrounds the lower portion of the primary spindle 26 and extends from the primary floor 22 to the secondary floor 24. The inside surfaces of the walls 14, including the ends 18 and 20, surround the portions of the secondary floor 24 that do not intersect the wall portion 42. The leading bottom edge 29 of the auger flighting 28 extends radially outward from the spindle 26 almost to the cylindrical wall 42. The leading bottom edge 29 should sweep substantially the entire primary floor 22 to insure that substantially all fodder is discharged from the primary floor 22 when discharging mixed and cut material from the tub 12. The leading bottom edges 41 of the auger flighting 40 attached to the secondary spindles 36 and 38 extend radially outward from the spindles almost to the end walls 18 and 20. The leading bottom edges 41 should sweep substantially all fodder from the secondary floor 24 to the primary floor 22 during material discharge.

The secondary vertical spindles 36 and 38 are positioned closer to the primary spindle 26 than the diameter of the area swept by the leading bottom edge 41 of the auger flighting 40. This spacing between the primary spindle 26 and the secondary spindles 36 and 38 minimizes the area of the floor 16 where ground and mixed fodder could possibly lodge during discharge of fodder from the tub 12. The spacing also results in a portion of the auger flighting 40 moving into positions above the portions of the primary floor 22 swept by the leading bottom edge 29 of the auger flighting 28. By raising the secondary floor 24 and the secondary spindles 36 and 38 relative to the primary floor 22 the conical auger flighting 40 can overlap the primary auger flighting 28 on the primary spindle 26 without moving into interference with the primary auger flighting.

The spindles 26, 36 and 38 can be driven mechanically through gearboxes or they can be driven hydraulically by a pump and hydrostatic motors. The pump is driven by a power take off drive shaft 49 that is connectable to a tractor. As shown in the drawing FIG. 2 a box 44 with a hydrostatic motor drives the primary spindle 26. The secondary spindles 36 and 38 are driven by boxes 46 and 48 that include hydrostatic motors. One or more pumps (not shown) supply hydraulic fluid to the hydraulic motors in the boxes 44, 46 and 48.

The spindles 26, 36 and 38 are journaled in is the gearboxes 44, 46 and 48 below the primary floor 22 or the secondary floor 24. Due to large bending loads that can be applied to the spindles 26, 36 and 38 when a 2,000 pound bale is dropped into the tub 12, two vertically spaced apart bearings are employed to journal each spindle.

The cutters 34 on one spindle 26, 36 or 38 are vertically spaced from the cutters on an adjacent spindle. The vertical separation of the cutters 34 on two adjacent spindles 26, 36 or 38 ensures that the cutters do not contact each other. Contact between cutters 34 on adjacent spindles 36 or 38 and 26 could also be avoided by providing a timed mechanical drive between the boxes 44, 46 and 48. Each cutter 34 has a series of teeth 60 that efficiently cut most grass and other fodder into short pieces that are easy for livestock to eat.

The vertical auger cutter mixer 10, as shown in FIG. 1, is part of a trailer 62. The trailer 62 includes a frame 64 mounted on tires and wheels 66 and 68 by a suspension system. The forward part of the frame 64 is a tongue 70. The forward end of the tongue 70 includes a vertical transverse plate 72. A coupler (not shown) is bolted to the plate 72. The coupler is normally a bar or bars with a vertical bore that receives a hitch pin and attaches the trailer to the drawbar of a tractor. The coupler could also be a ring member of a pintel hook hitch or a ball receiver of a ball hitch. The coupler is attached to the plate 72 at a height that is compatible with the tractor drawbar or other vehicle hitch member.

The tub 12 is connected to the trailer 62 by four pins 74, two of which are shown in FIG. 1. Each pin 74 includes a strain gauge. The strain gauges are attached to a calculator that displays the weight of fodder, grain protein supplements and any other rations placed in the tub 12, on a display screen 76. The strain gauges and the display screen 76 permits the operator of the vertical cutter mixer 10 to mix a balanced ration in the tub 12 for the animals to be fed. The tub 12 could also be mounted on the chassis of a truck rather than on a trailer frame. A third option is to mount the tub 12 and stationary structure and provide conveyors to carry the cut and mixed rations from the stationary tub 12.

An extension lip 78 extends upward from the walls 14 of the tub 12 to increase the capacity of the tub. The extension lip 78 is preferably a rubber belting or other material that will not be damaged by a large hay bale.

A discharge door 80 is provided in a side wall 14 of the tub 12. After the fodder and supplements are cut up and mixed to produce a ration, the discharge door 80 is opened and the rotating auger flighting 28 forces the ration through the discharge opening 82. The secondary spindles 36 and 33 feed the ration toward the primary spindle 26. The primary spindle 26 and the auger flighting 28 force the ration through the discharge opening 82 and substantially clean the primary floor 22. Very little ration is left in the tub 12.

The ration that is discharged through the discharge opening 82 is deposited upon a discharge conveyor 84. The discharge conveyor 84 can be a chute that directs material moved downward by gravity. The discharge conveyor 84 can also be driven conveyor that forces the ration away from the discharge opening 82. The discharge conveyor 84 shown in FIG. 1 is a belt conveyor with an upper ru86 that elevates a ration up and into a feed bunk as the cutter mixer is moving parallel to one side of the feed bunk.

Twenty thousand pounds of ration will feed several hundred cows. The door 80 may need to be closed as the cutter mixer 10 is moved from one feed bunk to another.

Figure 4:
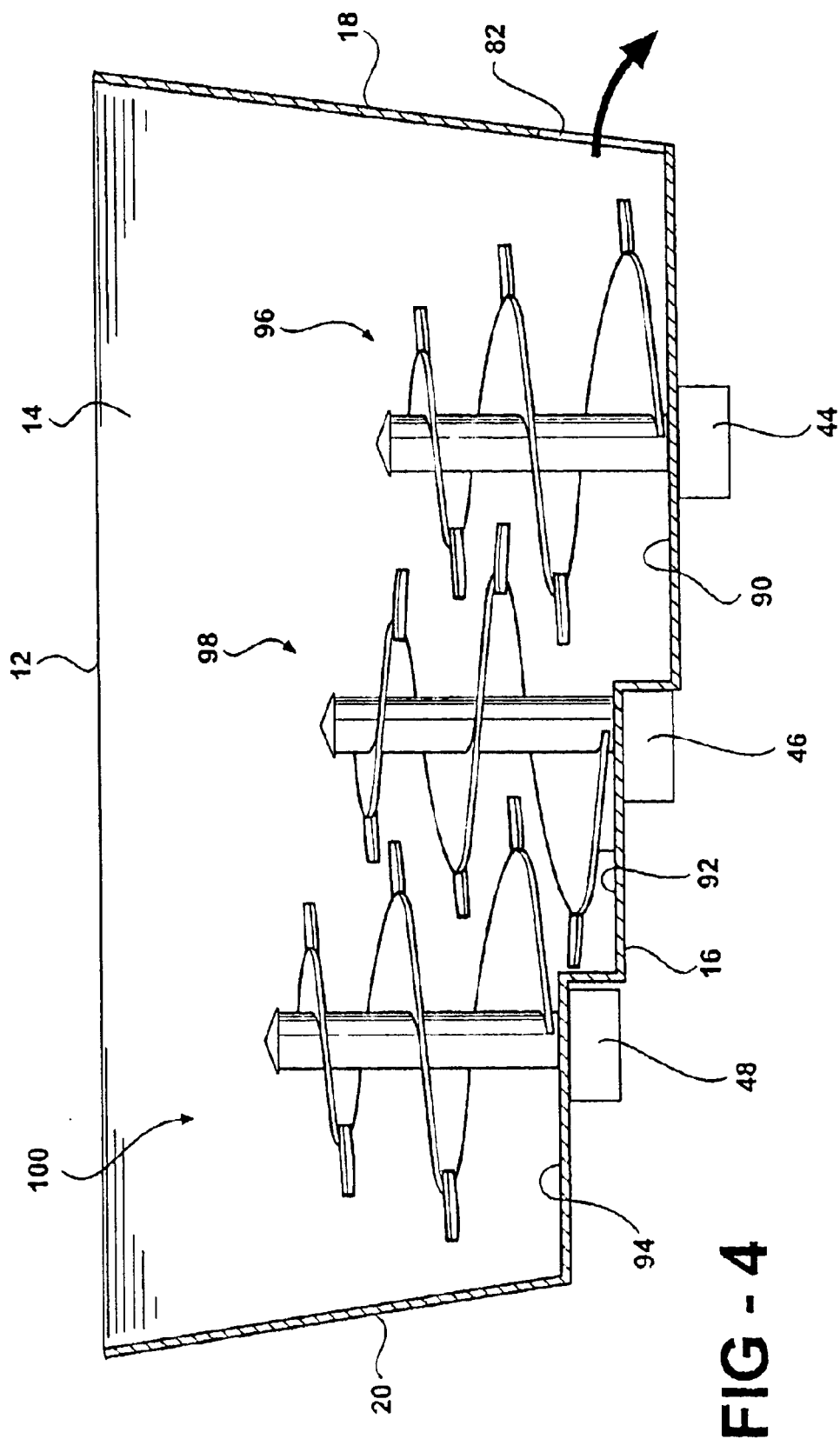
FIG. 4 is vertical sectional view of the tub with three vertical augers and attached cutters journaled on tub floor portions at three different heights.

The tub 12, shown in FIG. 4, has a modified floor 16. The primary horizontal floor 90 is at one end 18 adjacent to the discharge opening 82. The first horizontal secondary floor 92 is in the center of the tub and above the primary horizontal floor 90. The second horizontal secondary floor 94 is at the opposite end 20 of the tub 12 from the primary horizontal floor 90 and is above the first horizontal secondary floor 92. The primary spindle and auger flighting assembly 96 is identical to the primary spindle 26 and auger flighting 28 described above. The first vertical secondary spindle and auger assembly 98 is substantially identical to the secondary vertical spindles 36 and 38 and the auger flighting 40. The second vertical secondary spindle and auger assembly 100 is substantially identical to the first vertical secondary spindle and auger assembly 98 as described above.

The discharge opening 82 must have a lower edge that is no higher than the primary floor to ensure that the tub 12 is empty and substantially all of the fodder can be discharged. The entire tub 12 is symmetrical and could be reversed on the frame 64. The discharge opening 82 can be in the walls 14 midway between the ends 18 and 20, in a front corner, or in a rear corner, or in a rear corner. The discharge opening 82 can also be on the right hand side of the frame 64 or on the left hand side of the frame. There are six clear choices of location for the discharge opening 82. However, the exact location can vary somewhat in each of the six areas.

During operations of the vertical auger cutter mixer 10, the spindles 26, 36 and 38 are driven in a direction that forces material upward. As shown in FIG. 2, the two secondary spindles 36 and 38 rotate clockwise as viewed from above and the primary spindle 26 is driven in a counter clockwise direction. The auger flighting 28 and 40 can be selected and welded to each spindle 26, 36 and 38 for either clockwise or counter clockwise rotation as desired. The gearboxes 44, 46 and 48 are selected to drive each spindle in the selected direction. The material that is raised by the auger flighting moves from above the spindles 26, 36 and 38 outward toward the walls 14, 18 and 20 of the tub 12 and then downward toward the floor 16. When the material reaches a position in which it is again urged upward by the auger flighting 28 and 40 the mixing and cutting cycle is repeated. The teeth 60 on the cutters 34 engage fodder that is between the auger flighting 28 and 40 and on adjacent spindles 26, 36 and 38 or between the auger flighting and the walls 14 of the tub 12. The fodder engaged by the cutters 34 is cut or broken into smaller pieces. At the time of engagement by the cutters 34 fodder can be moving upward or downward.

The multiple vertical auger mixer 10 cuts bales of fodder apart, reduces the size of pieces of fodder for easier consumption by livestock and thoroughly mixes the fodder and supplements added to the fodder.

The three spindles 26, 36 and 38 in the tub 12 are capable of cutting up several hay bales, mixing a selected quantity of ration supplements and producing over 20,000 pounds of ready to feed ration will feed several hundred cattle. Some livestock feeders do not need a cutter mixer 10 with a capacity to feed several hundred cattle at one time. The capacity can be reduced by eliminating one of the spindles 36 or 38. The primary floor 22 and the raised secondary floor 24 permits two spindles 26 and 36 of a two spindle cutter mixer to be relatively close together and thereby ensure that the primary floor 22 and the secondary floor are fairly clean after discharging fodder through the opening 82.

It is understood that the disclosed embodiment is representative of a presently preferred form of the invention and the others that accomplish the same function are incorporated herein within the scope of any ultimately allowed patent claims.

What is claimed is:

1. A cutter mixer for cutting and mixing rations for livestock comprising:
    a tub having a continuous side wall, a floor attached to the continuous side wall and including a horizontal primary floor portion and at least one horizontal secondary floor portion at a higher elevation than the horizontal primary floor portion;
    a primary spindle journaled on the horizontal primary floor portion for rotation about a vertical primary spindle axis;
    a primary auger flighting secured to the primary spindle and having a primary leading bottom edge that extends horizontally outward from the primary spindle to sweep a circular portion of the horizontal primary floor portion with a primary auger bottom radius, a primary top discharge edge, and wherein a radial flighting width of the primary auger flighting decreases from the primary leading bottom edge to the primary top discharge edge;
    at least one secondary spindle journaled on the at least one horizontal secondary floor portion for rotation about a vertical secondary spindle axis of the at least one secondary spindle;
    a secondary auger flighting secured to the at least one secondary spindle and having a secondary leading bottom edge that extends horizontally outward from the at least one secondary spindle to sweep a portion of a circle with a secondary auger bottom radius, a secondary top discharge edge, and wherein a radial secondary flighting width of the secondary auger flighting decreases from the secondary leading bottom edge to the secondary top discharge edge; and
    wherein the horizontal distance from the vertical primary spindle axis to the vertical secondary spindle axis is less than the sum of the primary auger bottom radius plus the secondary auger bottom radius.

2. A cutter mixer for cutting and mixing rations for livestock, as set forth in claim 1, wherein the primary auger flighting is incapable of contacting the secondary auger flighting.

3. A cutter mixer for cutting and mixing rations for livestock, as set forth in claim 1, including a plurality of first cutters secured to the primary auger flighting and extending radially outward from a primary flighting radially outer edge; and
    a plurality of second cutters secured to the secondary auger flighting and extending radially outward from a secondary flighting radially outer edge and wherein the plurality of first cutters and the plurality of second cutters are vertically spaced from each other.

4. A cutter mixer for cutting and mixing rations for livestock, as set forth in claim 1, wherein the floor of the tub includes a floor portion extending upward from the horizontal primary floor portion to the at least one horizontal secondary floor portion.

5. A cutter mixer for cutting and mixing rations for livestock, as set forth in claim 1, including an additional horizontal secondary floor portion that is on the opposite side of the horizontal primary floor portion from the at least one horizontal second floor portion and wherein the additional horizontal secondary floor portion and the at least one horizontal secondary floor portion are both spaced the same distance above the horizontal primary floor portion; and an additional secondary spindle with an attached secondary flighting journaled on the additional horizontal secondary floor portion.

6. A cutter mixer for cutting and mixing rations for livestock, as set forth in claim 1, including a primary gearbox and hydraulic motor driving the primary spindle and a secondary gear box and hydraulic motor driving the at least one secondary spindle.

7. A cutter mixer for cutting and mixing rations for livestock, as set forth in claim 1, including an additional horizontal secondary floor portion that is on the opposite side of the at least one horizontal secondary floor portion from the horizontal primary floor portion and the additional horizontal secondary floor portion is at a higher elevation than the at least one horizontal secondary floor portion.

8. A cutter mixer for cutting and mixing rations for livestock, as set forth in claim 1, wherein the tub is mounted on a frame supported by wheels and adapted to be attached to a tractor.

9. A cutter mixer for cutting and mixing rations for livestock, as set forth in claim 1, including a frame connected to and supporting the tub and a weight measuring device between the frame and the tub that measures the weight of rations in the tub.

10. A cutter mixer for cutting and mixing rations for livestock, as set forth in claim 1, including a discharge opening in the continuous side wall adjacent to the horizontal primary floor.

11. A cutter mixer for cutting and mixing rations for livestock comprising;
    a tub having a continuous side wall, a floor attached to the continuous side wall and including a horizontal primary floor portion, and at least one horizontal secondary floor portion at a higher elevation than the horizontal primary floor portion;
    a primary spindle journaled on the horizontal primary floor portion for rotation about a vertical primary spindle axis;

a primary auger flighting secured to the primary spindle;

at least one secondary spindle journaled on the at least one horizontal secondary floor portion for rotation about a vertical secondary spindle axis of the at least one secondary spindle;

a secondary auger flighting secured to the at least one secondary spindle;

a primary spindle drive connected to the primary spindle; and a secondary spindle drive connected to the at least one secondary spindle.

12. A cutter mixer for cutting and mixing rations for livestock comprising:

a tub having a continuous side wall, floor attached to the continuous side wall and including a horizontal primary floor portion;

a first horizontal secondary floor portion at a higher elevation than the horizontal primary floor portion;

a primary spindle journaled on the horizontal primary floor portion for rotation about a vertical primary spindle axis;

a primary auger flighting secured to the primary spindle;

a first secondary spindle journaled on the first horizontal secondary floor portion for rotation about a first vertical secondary spindle axis of the first secondary spindle;

a first secondary auger flighting secured to the first secondary spindle;

a primary spindle drive connected to the primary spindle;

a second horizontal secondary floor portion at a higher elevation than the horizontal primary floor portion;

a second secondary spindle journaled on the second horizontal secondary floor portion for rotation about a second vertical secondary spindle axis of the second secondary spindle;

a second secondary auger flighting secured to the second secondary spindle; and a second secondary spindle drive connected to the second secondary spindle.

13. A cutter mixer for cutting and mixing rations for livestock, as set forth in claim 12, wherein the first horizontal secondary floor portion and the second horizontal secondary floor portion are at the same elevation.

14. A cutter mixer for cutting and mixing rations for livestock, as set forth in claim 13, wherein the horizontal primary floor portion is between the first horizontal secondary floor portion and the second horizontal secondary floor portion.

15. A cutter mixer for cutting and mixing rations for livestock, as set forth in claim 12, wherein the second horizontal secondary floor portion is at a higher elevation than the first horizontal secondary floor portion.

16. A cutter mixer for cutting and mixing rations for livestock, as set forth in claim 15, wherein the first horizontal secondary floor portion is positioned between the horizontal primary floor portion and the second horizontal secondary floor portion.

* * * * *